United States Patent
Iwakura et al.

(10) Patent No.: US 12,288,026 B2
(45) Date of Patent: Apr. 29, 2025

(54) INFORMATION PROCESSING METHOD, COMPUTER-READABLE RECORDING MEDIUM STORING INFORMATION PROCESSING PROGRAM, AND INFORMATION PROCESSING DEVICE

(71) Applicant: FUJITSU LIMITED, Kawasaki (JP)

(72) Inventors: Tomoya Iwakura, Kawasaki (JP); Taiki Watanabe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 583 days.

(21) Appl. No.: 17/671,663

(22) Filed: Feb. 15, 2022

(65) Prior Publication Data

US 2022/0171928 A1 Jun. 2, 2022

Related U.S. Application Data

(63) Continuation of application No. PCT/JP2019/034162, filed on Aug. 30, 2019.

(51) Int. Cl.
*G06F 40/00* (2020.01)
*G06F 3/08* (2006.01)
(Continued)

(52) U.S. Cl.
CPC .............. *G06F 40/274* (2020.01); *G06F 3/08* (2013.01); *G06F 40/284* (2020.01)

(58) Field of Classification Search
CPC ........ G06F 40/274; G06F 3/08; G06F 40/284; G06F 16/30; G06F 16/90; G06N 3/044; G06N 3/08
See application file for complete search history.

(56) References Cited

U.S. PATENT DOCUMENTS 9,298,276 B1 * 3/2016 Bi ........................ G06F 3/0236
2010/0325145 A1 * 12/2010 Hashimoto ......... G06F 16/3322
707/769

FOREIGN PATENT DOCUMENTS

JP H06-176073 A 6/1994
JP H09-044496 A 2/1997
(Continued)

OTHER PUBLICATIONS

Distiawan B, Weikum G, Qi J, Zhang R. Neural relation extraction for knowledge base enrichment. In Proceedings of the 57th Annual Meeting of the Association for Computational Linguistics Jul. 2019 (pp. 229-240). (Year: 2019).*

(Continued)

*Primary Examiner* — Richa Sonifrank
*Assistant Examiner* — Parker Mayfield
(74) *Attorney, Agent, or Firm* — Fujitsu Intellectual Property Center

(57) ABSTRACT

An information processing method in which a computer executes processing includes: acquiring a sentence; specifying a word that appears immediately before or immediately after a first word in the acquired sentence by using a prediction model that predicts a word that appears immediately before or immediately after an input word; determining whether or not an estimated relationship between the first word and the second word in the sentence is appropriate on the basis of the specified word and a rule regarding a unit that corresponds to a relationship between words stored in a storage; and outputting information regarding the estimated relationship between the first word and the second word in a case where it is determined that the relationship is appropriate.

8 Claims, 12 Drawing Sheets

(51) Int. Cl.
*G06F 40/274* (2020.01)
*G06F 40/284* (2020.01)

(56) References Cited

FOREIGN PATENT DOCUMENTS

| JP | 2004-118647 A | 4/2004 |
|---|---|---|
| JP | 2010-117797 A | 5/2010 |
| JP | 2019-117486 A | 7/2019 |

OTHER PUBLICATIONS

Ghazvininejad M, Levy O, Liu Y, Zettlemoyer L. Constant-time machine translation with conditional masked language models. arXiv preprint arXiv:1904.09324. 2019. (Year: 2019).*

Japanese Office Action mailed Nov. 8, 2022 for corresponding Japanese Patent Application No. 2021-541927 with English Translation, 11 pages. *Please note JP-6-176073-A and JP-2010-117797-A cited herewith, were previously cited in an IDS filed on Feb. 15, 2022 *.

Daojian Zeng et al., "Distant Supervision for Relation Extraction via Piecewise Convolutional Neural Networks", Proceedings of the 2015 Conference on Empirical Methods in Natural Language Processing, Lisbon, Portugal, Association for Computational Linguistics, pp. 1753-1762, Sep. 17-21, 2015 (Total 10 pages).

Mike Mintz et al., "Distant Supervision for Relation Extraction Without Labeled Data", Proceedings of the 47th Annual Meeting of the ACL and the 4th IJCNLP of the AFNLP, Suntec, Singapore, ACL and AFNLP, vol. 2, pp. 1003-1011, Aug. 2-7, 2009 (Total pages).

International Search Report and Written Opinion of the International Searching Authority (Form PCT/ISA/210, 220, and 237), mailed in connection with PCT/JP2019/034162 and mailed Nov. 5, 2019 (Total 12 pages).

* cited by examiner

FIG. 5

RELATIONSHIP DB 500

| RELATIONSHIP | WORD |
|---|---|
| BOILING POINT | °C, °F, K, ... |
| MELTING POINT | °C, °F, K, ... |
| MOLECULAR WEIGHT | g/mol, ... |

500-1: BOILING POINT row
500-2: MELTING POINT row
500-3: MOLECULAR WEIGHT row

FIG. 10
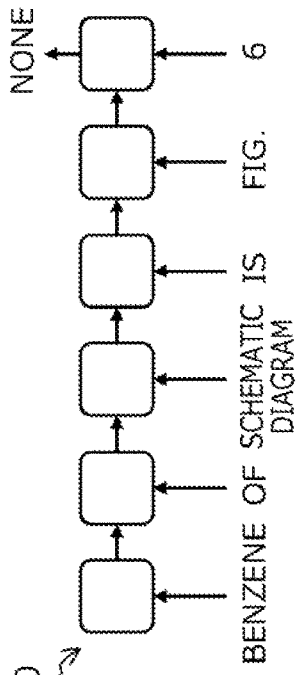
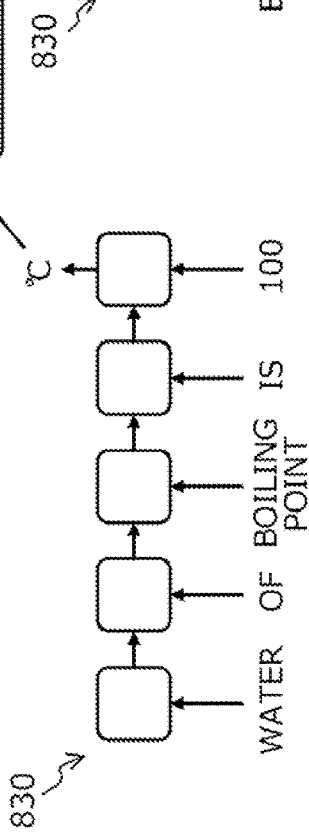

INFORMATION PROCESSING METHOD, COMPUTER-READABLE RECORDING MEDIUM STORING INFORMATION PROCESSING PROGRAM, AND INFORMATION PROCESSING DEVICE

CROSS-REFERENCE TO RELATED APPLICATION

This application is a continuation application of International Application PCT/JP2019/034162 filed on Aug. 30, 2019 and designated the U.S., the entire contents of which are incorporated herein by reference.

FIELD

The embodiment discussed herein is related to an information processing method, an information processing program, and an information processing device.

BACKGROUND

Typically, there is a case where useful information included in a predetermined sentence is extracted and the extracted information is used for information retrieval, information analysis, comprehension assistance, or the like. For example, it is considered to extract useful information such as a name of a compound, a molecular formula and a molecular weight of a compound, a physical property value of a compound, or functions or uses of a compound, included in a technical document such as patent documents or technical papers in the chemistry field.

Japanese Laid-open Patent Publication No. 2019-117486 is disclosed as related art.

SUMMARY

According to an aspect of the embodiments, an information processing method in which a computer executes processing includes: acquiring a sentence; specifying a word that appears immediately before or immediately after a first word in the acquired sentence by using a prediction model that predicts a word that appears immediately before or immediately after an input word; determining whether or not an estimated relationship between the first word and the second word in the sentence is appropriate on the basis of the specified word and a rule regarding a unit that corresponds to a relationship between words stored in a storage; and outputting information regarding the estimated relationship between the first word and the second word in a case where it is determined that the relationship is appropriate.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is an explanatory diagram illustrating an example of content stored in a relationship DB 500;

FIG. 10 is an explanatory diagram illustrating details of generating learning data;

DESCRIPTION OF EMBODIMENTS

For example, there is a technique for specifying a part name corresponding to a part of a compound name in a first language from data of a sentence in the first language, specifying a first element immediately before or immediately after the specified part name, and converting an expression of the specified first element into an expression in a second language.

Here, a method is considered for extracting useful information related to a specific word included in a predetermined sentence using a discrimination model that discriminates a relationship between words. However, with the related art, it is difficult to enhance discrimination accuracy of the discrimination model that discriminates the relationship between the words. For example, it is difficult to prepare a large number of sentences including a word pair having a predetermined relationship, that may be appropriate learning data used to learn the discrimination model that discriminates the relationship between the words.

In one aspect, an object of the present embodiment is to enhance discrimination accuracy of a discrimination model that discriminates a relationship between words by creating high-quality learning data used to discriminate the relationship between the words.

Hereinafter, embodiments of an information processing method, an information processing program, and an information processing device according to the present invention will be described in detail with reference to the drawings.

One Example of Information Processing Method According to Embodiment

Figure 1:
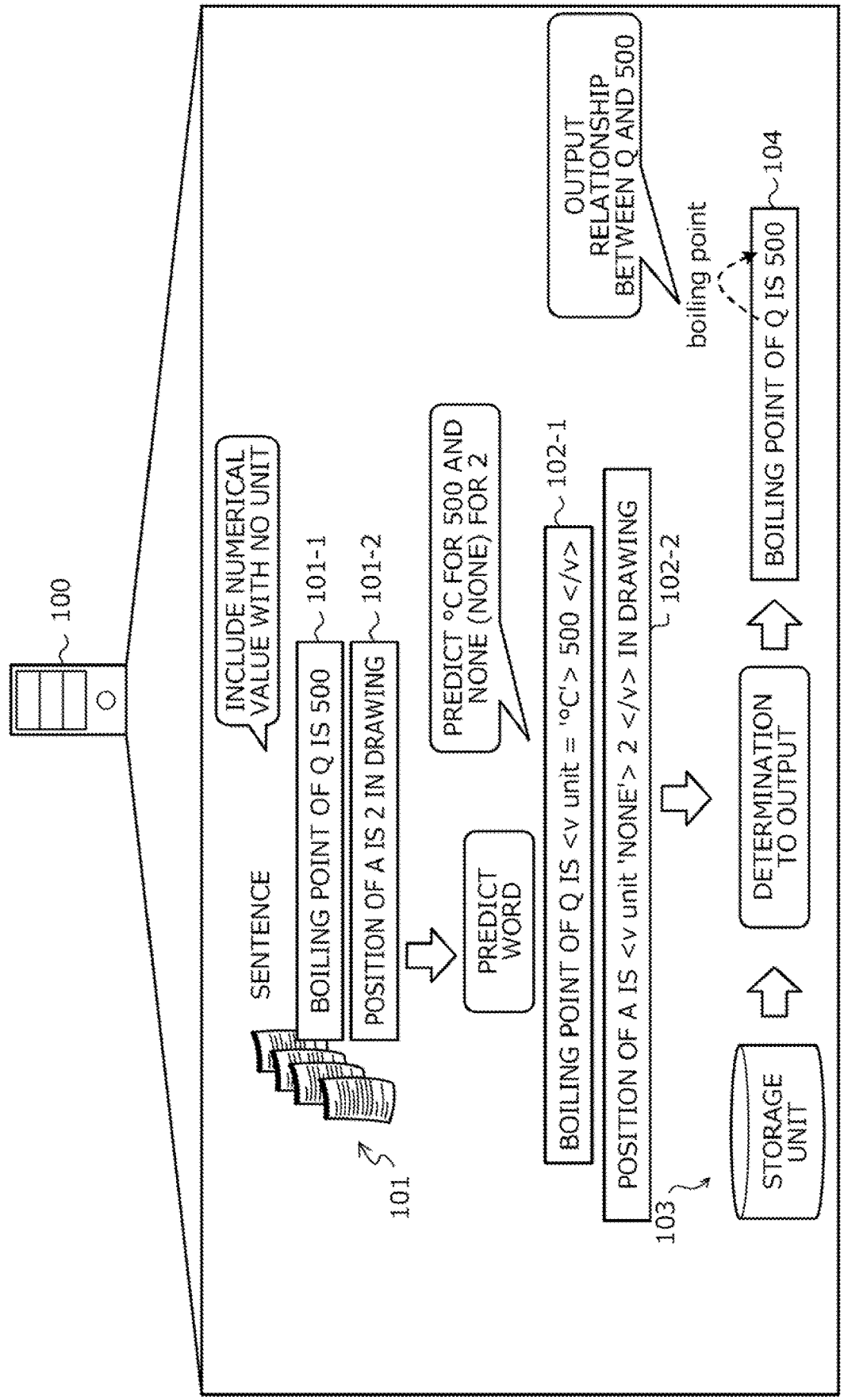
FIG. 1 is an explanatory diagram illustrating one example of an information processing method according to an embodiment.

FIG. 1 is an explanatory diagram illustrating one example of an information processing method according to an embodiment. An information processing device 100 is a computer that assists sentence analysis for information retrieval, information analysis, comprehension assistance, or the like.

Typically, it is desired to generate a knowledge base that extracts useful information included in a predetermined sentence and summarizes the useful information for information retrieval, information analysis, comprehension assistance, or the like. For example, a human extracts useful information from a sentence to be a sample and generates a knowledge base.

Specifically, for example, in the chemistry field, it is considered to extract useful information such as a name of a compound, a molecular formula and a molecular weight of a compound, a physical property value of a compound, or functions and uses of a compound, included in a technical document such as patent documents or technical papers and generate a knowledge base by a human. A compound is a chemical substance formed from two or more elements. The compounds include, for example, organic compounds and inorganic compounds.

Here, when a work for generating the knowledge base is performed, the useful information to be added to the knowledge base can be enormous, and there is a possibility that a workload, a work time, cost, and the like for a worker increase. Furthermore, it is difficult to add the useful information to the knowledge base without omission, and there is a possibility that the workload, the work time, the cost, and the like of workers increase, and there is a possibility that usability of the knowledge base is deteriorated.

Furthermore, in some situations, it is preferable to regularly update the knowledge base. However, there is a possibility that this increases the workload, work time, the cost, and the like for workers. Specifically, for example, in the chemistry field, each time when a new compound is generated, it is considered to be preferable to add useful information such as a name, a molecular formula, a molecular weight, a physical property value, or functions or uses, of the new compound to the knowledge base and update the knowledge base.

Therefore, a method for automatically extracting useful information included in a predetermined sentence is required. For example, a method is considered for extracting useful information related to a specific word included in a predetermined sentence using a discrimination model. Specifically, for example, in the chemistry field, it is considered to extract useful information such as a molecular formula and a molecular weight of a compound related to a name of the compound, a physical property value of the compound, or functions and uses of the compound, included in a technical document such as patent documents or technical papers, using the discrimination model.

In the chemistry field, as an example of a sentence "Octoxyglycerin has a relative molecular weight of 204.31 g/mol." is considered. In this sentence, it is considered to determine a relationship between the name "Octoxyglycerin" of the compound and the numerical value "204.31". Then, it is considered to extract the numerical value "204.31" having a predetermined relationship "Molecular Weight" with the name "Octoxyglycerin" of the compound as a physical property value.

Here, the discrimination model is learned on the basis of learning data. The learning data is generated, for example, on the basis of a sentence including a word pair having a predetermined relationship. Specifically, for example, the learning data is correspondence information in which a sentence including a word pair is associated with a relationship of a word pair to be correct answer data so as to specify the word pair.

However, it is difficult to prepare a large amount of sentences including word pairs having a predetermined relationship, that may be appropriate learning data, used to learn the discrimination model, and it is difficult to enhance discrimination accuracy of the discrimination model. For example, when a work for preparing appropriate learning data is performed, there is a possibility that a workload, a work time, cost, and the like for workers increase.

Therefore, as in the reference document 1 below, there is a method for creating learning data by automatically adding a tag to a text using an existing knowledge base. The basic idea of this method is a method for adding a relationship of a pair when the pair of words registered in the existing knowledge base appears in the same text. For example, if a relationship between "Q" and "500" is "boiling point" and "the boiling point of Q is 500" as in FIG. 1, learning data such that "Q" and "500" in this sentence have the relationship "boiling point" is automatically generated. However, if the learning data used to learn the discrimination model includes a result of adding an inappropriate tag, this may deteriorate the discrimination accuracy of the discrimination model.

Reference Document 1: "Distant supervision for relation extraction without labeled data" Proceedings of the 47th Annual Meeting of the Association for Computational Linguistics and the 4th International Joint Conference on Natural Language Processing, pages 1003 to 1011, 2009.

For example, in the chemistry field, it is preferable to use a sentence including a word pair having a predetermined relationship such as a word pair of a name of a compound and a physical property value of the compound as appropriate learning data. On the other hand, for example, it is not preferable to use a sentence including a word pair that does not have a predetermined relationship such as a word pair of a name of a compound and a number that is a not a physical property value of the compound as appropriate learning data, and the sentence is inappropriate learning data.

On the other hand, even if the learning data is made to be automatically prepared, it is difficult to prepare only appropriate learning data, and it is difficult to enhance the discrimination accuracy of the discrimination model. For example, it is difficult to determine whether or not a numerical value with no unit is a physical property value, and it is difficult to determine whether or not a sentence including a numerical value with no unit is appropriate learning data. Therefore, there is a case where the sentence including the numerical value with no unit, that is not a physical property value, is erroneously adopted as the learning data. The numerical value which is not the physical property value is, for example, a figure number, the number of pages, a type number, or the like. For example, there is a case where a sentence "The information of the $H_2O$ is included in Figure 100." is erroneously adopted as the learning data as a sentence including a word pair having a relationship of a boiling point between $H_2O$ (water) and 100° C.

On the other hand, because it is difficult to determine whether or not the sentence including the numerical value with no unit is appropriate learning data, a case is considered where the sentence including the numerical value with no unit is not uniformly adopted as learning data. In this case, there is a case where a sentence that may be appropriate learning data is not adopted as learning data, and this reduces the number of pieces of prepared learning data, and it is difficult to enhance the discrimination accuracy of the discrimination model. For example, there is a sentence "This effect was demonstrated by observing the adsorption of riboflavin, which has a molecular weight of 376". Although this sentence includes a word pair of a name of a compound "Riboflavin" and a molecular weight "376" of the compound and may be appropriate learning data, the sentence is not adopted as learning data.

Therefore, in the present embodiment, an information processing method that can prepare appropriate learning data at the time of learning a discrimination model that discriminates a relationship between words will be described.

In FIG. 1, the information processing device 100 includes a storage unit 103. The storage unit 103 stores rules regarding a unit corresponding to a relationship between words. The rule specifies, for example, a list of words that can be assigned to one word of a word pair in a case where the word pair has a predetermined relationship. Furthermore, the storage unit 103 stores information that makes it possible to estimate a relationship between predetermined words.

(1-1) The information processing device 100 acquires a sentence 101. The sentence 101 is, for example, a technical document in the chemistry field. The sentence 101 includes, for example, a numerical value with no unit. In the example in FIG. 1, the sentence 101 is, for example, a sentence 101-1, a sentence 101-2, or the like. The sentence 101-1 is "the boiling point of Q is 500". The sentence 101-2 is "a position of A is 2 in the drawing".

The information processing device 100 acquires the sentence 101, for example, by receiving an input of the sentence 101 on the basis of an operation input of a user. The information processing device 100 may also acquire the sentence 101, for example, by receiving the sentence 101 from another computer.

(1-2) The information processing device 100 specifies a word that appears immediately after a first word in the acquired sentence 101 using a prediction model. The prediction model predicts a word that appears immediately after an input word. The first word is, for example, a numerical value. The first word is, specifically, for example, a numerical value with no unit. The word that appears immediately after the first word is, for example, a unit.

In the example in FIG. 1, the information processing device 100 acquires a word "° C." that is predicted to appear immediately after the word "500" in the sentence 101-1 "the boiling point of Q is 500" and saves a result 102-1 added to the sentence 101-1. Furthermore, the information processing device 100 acquires "NONE" if there is no word that is predicted to appear immediately after the numerical value "2" in the sentence 101-2 "a position of A is 2 in the drawing" and saves a sentence 102-2 added to the sentence 101-2.

(1-3) The information processing device 100 determines whether or not an estimated relationship between the first word and a second word in the sentence 101 is appropriate on the basis of the specified word and the rule regarding the unit corresponding to the relationship between the words stored in the storage unit 103. The second word is, for example, a name of a compound. The relationship is, for example, estimated on the basis of the storage unit 103.

In the example in FIG. 1, regarding the sentence 101-1 "the boiling point of Q is 500", the information processing device 100 determines whether or not a unit "° C." corresponding to the estimated relationship "boiling point" between the word "Q" and the word "500" matches the acquired word "° C.". Then, because both words match, the information processing device 100 determines that the estimated relationship "boiling point" between the word "Q" and the word "500" is appropriate.

Furthermore, regarding the sentence 101-2 "a position of A is 2 in the drawing", the information processing device 100 determines whether or not a unit "° C." corresponding to the estimated relationship "melting point" between the word "A" and the word "2" matches the acquired information "NONE". Then, because the both words do not match, the information processing device 100 determines that the estimated relationship "melting point" between the word "A" and the word "2" is a noise and is not appropriate.

(1-4) In a case of determining that the relationship is appropriate, the information processing device 100 outputs information 104 regarding the estimated relationship between the first word and the second word. In the example in FIG. 1, the information processing device 100 outputs the estimated relationship "boiling point" between the word "Q" and the word "500". On the other hand, the information processing device 100 does not output the estimated relationship "melting point" between the word "A" and the word "2", that is determined to be not appropriate.

As a result, the information processing device 100 can use the relationship between the words that is determined as appropriate in the sentence. Therefore, the information processing device 100 can use the sentence, including the word pair having the predetermined relationship that is determined as appropriate, that may be appropriate learning data used to learn the discrimination model and can generate appropriate learning data. Furthermore, the information processing device 100 can remove a sentence including a word pair that does not have a predetermined relationship and can prevent inappropriate learning data from being generated. Here, the learning data may also be generated, for example, by the information processing device 100. The learning data may also be generated, for example, by a computer other than the information processing device 100 that has received the information 104 output by the information processing device 100.

Then, the information processing device 100 can enhance the discrimination accuracy of the discrimination model on the basis of the sentence, including the word pair having the predetermined relationship, that may be appropriate learning data used to learn the discrimination model. Furthermore, the information processing device 100 can suppress an increase in a workload, working time, cost, or the like for workers when a work for preparing appropriate learning data is performed. Here, the discrimination model may also be generated, for example, by the information processing device 100. The discrimination model may also be generated, for example, by a computer other than the information processing device 100.

As a result, the information processing device 100 can extract useful information from a technical document using the discrimination model and can automatically generate a knowledge base. Furthermore, the information processing device 100 can easily update the knowledge base. Therefore, the information processing device 100 can suppress an increase in a workload, working time, cost, or the like for workers when a work for generating the knowledge base is performed. Here, the knowledge base may also be generated, for example, by the information processing device 100. The knowledge base may also be generated, for example, by a computer other than the information processing device 100.

Here, a case has been described where the sentence 101 is a technical document in the chemistry field, the first word is a numerical value, and the second word is a name of a compound. However, the embodiment is not limited to this. For example, there may also be a case where the sentence 101 is not a technical document, the first word is a numerical value, and the second word is a name of a place, a name of a person, a name of an organization, or the like. For example, a case of a name of an organization, sales, or the like is considered. Furthermore, the first word may be a name of a person or a place. In that case, if the first word is a word that may mean a name of a person or a place such as "Miyazaki" or "Fukuoka", it is considered that a title for a person's name such as "san" or "sama" for the name of the person, "city" or "prefecture" for the place is predicted instead of units.

Here, a case has been described where the prediction model predicts the word that appears immediately after the input word. However, the embodiment is not limited to this. For example, there may also be a case where the prediction model predicts a word that appears immediately before the input word. Specifically, for example, there may also be a case where the prediction model predicts a unit such as \ or $ that appears immediately before an input number.

Here, a case has been described where the first word appears after the second word. However, the embodiment is not limited to this. For example, there may also be a case where the second word appears after the first word. Specifically, for example, there may also be a case where, as in a sentence "a substance having the boiling point of 100 is water", the second word "water" appears after the first word "100".

In the following description, a case will be mainly described where the information processing device 100 generates learning data, a discrimination model, and a knowledge base. There may also be a case where a computer other than the information processing device 100 generates learning data, a discrimination model, and a knowledge base.

(Example of Sentence Analysis System 200)

Next, an example of a sentence analysis system 200 to which the information processing device 100 illustrated in FIG. 1 is applied will be described with reference to FIG. 2.

Figure 2:
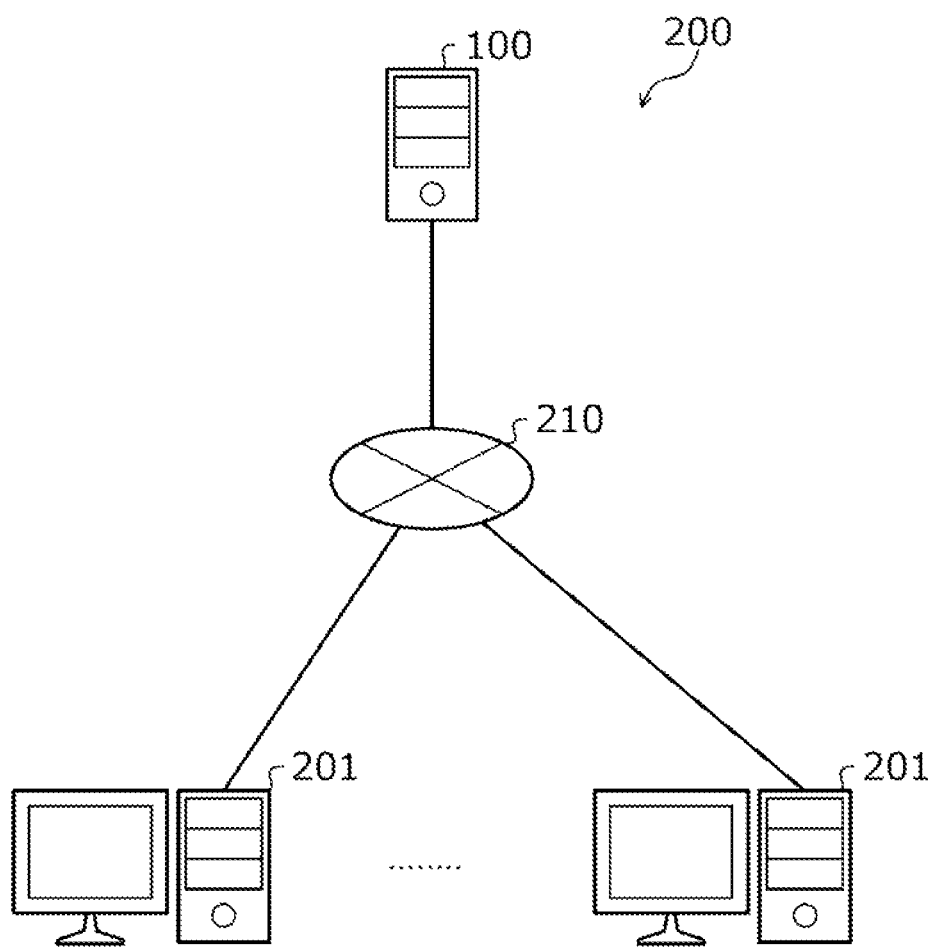
FIG. 2 is an explanatory diagram illustrating an example of a sentence analysis system 200.

FIG. 2 is an explanatory diagram illustrating an example of the sentence analysis system 200. In FIG. 2, the sentence analysis system 200 includes the information processing device 100 and one or more client devices 201.

In the sentence analysis system 200, the information processing device 100 and the client device 201 are connected via a wired or wireless network 210. The network 210 is, for example, a local area network (LAN), a wide area network (WAN), the Internet, or the like.

The information processing device 100 stores various data bases (DB) to be described later with reference to FIGS. 4 and 5. The information processing device 100 acquires a plurality of sentences used to generate a discrimination model and generates learning data used to learn the discrimination model that discriminates a relationship between words on the basis of the plurality of acquired sentences. The information processing device 100 learns the discrimination model on the basis of the generated learning data.

Specifically, for example, the discrimination model discriminates a relationship between a name of a compound and a numerical value. Specifically, for example, the discrimination model may also discriminate a relationship between a name of a place and a numerical value. Specifically, for example, the discrimination model may also discriminate a relationship between a name of an organization and a numerical value. Specifically, for example, the discrimination model may also discriminate a relationship between a name of a person and a numerical value. Specifically, for example, the discrimination model may also discriminate a relationship between a name of a person and a name of a place.

The information processing device 100 acquires a plurality of sentences used to generate a knowledge base and generates the knowledge base on the basis of the plurality of acquired sentences using the discrimination model. The plurality of sentences used to generate the discrimination model and the plurality of sentences used to generate the knowledge base may also include the same sentence.

The information processing device 100 provides a service such as information retrieval, information analysis, or comprehension assistance to the client device 201 using the knowledge base. The information processing device 100 is, for example, a server, a personal computer (PC), a tablet terminal, a smartphone, or the like.

The client device 201 is a computer that accesses the information processing device 100 and uses the service such as information retrieval, information analysis, or comprehension assistance. The client device 201 is, for example, a PC, a tablet terminal, a smartphone, or the like.

Application Example 1 of Information Processing Device 100

The information processing device 100 can be applied to, for example, the chemistry field. In this case, the information processing device 100 can generate a knowledge base in which physical property values of compounds are summarized on the basis of technical documents such as patent documents or technical papers, for example, using the discrimination model that discriminates the relationship between the name of the compound and the numerical value. Then, the information processing device 100 can achieve the service such as information retrieval, information analysis, or comprehension assistance in the chemistry field on the basis of the knowledge base.

In this case, the physical property value of the compound is, for example, a boiling point, a melting point, or the like. A unit is, for example, ° C., K, or the like. Furthermore, the unit may also be, for example, pH or the like. Therefore, for example, the unit may also be added immediately before a numerical value or immediately after a numerical value. The relationship between the name of the compound and the numerical value indicates, for example, what kind of physical property value regarding the compound having the name the numerical value is.

Application Example 2 of Information Processing Device 100

Furthermore, the information processing device 100 can be applied to, for example, the information utilization field regarding places. In this case, the information processing device 100 can generate a knowledge base in which attribute values of places are summarized, for example, using the discrimination model that discriminates the relationship between the name of the place and the numerical value. Then, the information processing device 100 can achieve a service such as information retrieval, information analysis, or comprehension assistance regarding places on the basis of the knowledge base.

In this case, the attribute value of the place is, for example, a size of the place, a capacity of the place, a travel time to the place, or the like. The unit is, for example, m^2, person, minute, or the like. The relationship between the name of the place and the numerical value indicates what kind of attribute value regarding the place having the corresponding name the corresponding numerical value is.

Application Example 3 of Information Processing Device 100

Furthermore, the information processing device 100 can be applied to, for example, the information utilization field regarding organizations. In this case, the information processing device 100 can generate a knowledge base in which attribute values of organizations are summarized, for example, using the discrimination model that discriminates the relationship between the name of the organization and the numerical value. Then, the information processing device 100 can achieve a service such as information retrieval, information analysis, or comprehension assistance regarding organizations on the basis of the knowledge base.

In this case, the attribute value of the organization is, for example, a capital stock of an organization, the number of people belonging to the organization, or the like. The unit is, for example, \, $, or person. The relationship between the name of the organization and the numerical value indicates what kind of attribute value regarding the organization having the corresponding name the corresponding numerical value is.

Application Example 4 of Information Processing Device 100

Furthermore, the information processing device 100 can be applied to, for example, the information utilization field regarding persons. In this case, the information processing device 100 can generate a knowledge base in which attribute values of persons are summarized, for example, using the discrimination model that discriminates the relationship between the name of the person and the numerical value. Then, the information processing device 100 can achieve a service such as information retrieval, information analysis, or comprehension assistance regarding persons on the basis of the knowledge base.

In this case, the attribute value of the person is, for example, a birthday of a person, a height of a person, a weight of a person, an ID of a person, or the like. The unit is month, day, cm, kg, No., or the like. The relationship between the name of the person and the numerical value indicates what kind of attribute value regarding the person of the corresponding name the corresponding numerical value is.

Application Example 5 of Information Processing Device 100

Furthermore, the information processing device 100 can be applied to, for example, the information utilization field regarding persons and places. In this case, the information processing device 100 can generate a knowledge base in which places regarding persons are summarized, for example, using the discrimination model that discriminates the relationship between the name of the person and the name of the place. Then, the information processing device 100 can achieve a service such as information retrieval, information analysis, or comprehension assistance regarding persons on the basis of the knowledge base.

In this case, the place regarding the person is, for example, a hometown of a person or the like. The unit is, for example, an administrative division such as a municipality. Furthermore, the unit may also be, for example, a division unit such as stations, streets, or buildings. The relationship between the name of the person and the name of the place indicates how the corresponding person is related to the corresponding place.

Application Example 6 of Information Processing Device 100

Furthermore, the information processing device 100 can be applied to, for example, the information utilization field regarding persons and organizations. In this case, the information processing device 100 can generate a knowledge base in which organizations regarding persons are summarized, for example, using the discrimination model that discriminates the relationship between the name of the person and the name of the organization. Then, the information processing device 100 can achieve a service such as information retrieval, information analysis, or comprehension assistance regarding persons on the basis of the knowledge base.

In this case, the organization regarding the person is, for example, an organization to which a person belongs, or the like. The unit is, for example, a division unit such as offices, private limited companies, or joint-stock companies. The relationship between the name of the person and the name of the organization indicates how the corresponding person is related to the corresponding organization.

Here, a case has been described where the information processing device 100 is a device different from the client device 201. However, the embodiment is not limited to this. For example, there may also be a case where the information processing device 100 is integrated with the client device 201.

Here, a case has been described where the information processing device 100 generates the learning data, learns the discrimination model, generates the knowledge base, and provides the service. However, the embodiment is not limited to this. For example, there may also be a case where the information processing device 100 makes another computer learn the discrimination model, generate the knowledge base, and provide the service by generating the learning data and providing the learning data to the another computer. Specifically, for example, the another computer may also be the client device 201.

Furthermore, for example, there may also be a case where the information processing device 100 makes another computer generate the knowledge base and provide the service by learning the discrimination model and providing the discrimination model to the another computer. Specifically, for example, the another computer may also be the client device 201.

In the following description, a case will be described where the information processing device 100 is applied to the chemistry field and learns the discrimination model that discriminates the relationship between the name of the compound and the numerical value.

(Hardware Configuration Example of Information Processing Device 100)

Next, a hardware configuration example of the information processing device 100 will be described with reference to FIG. 3.

Figure 3:
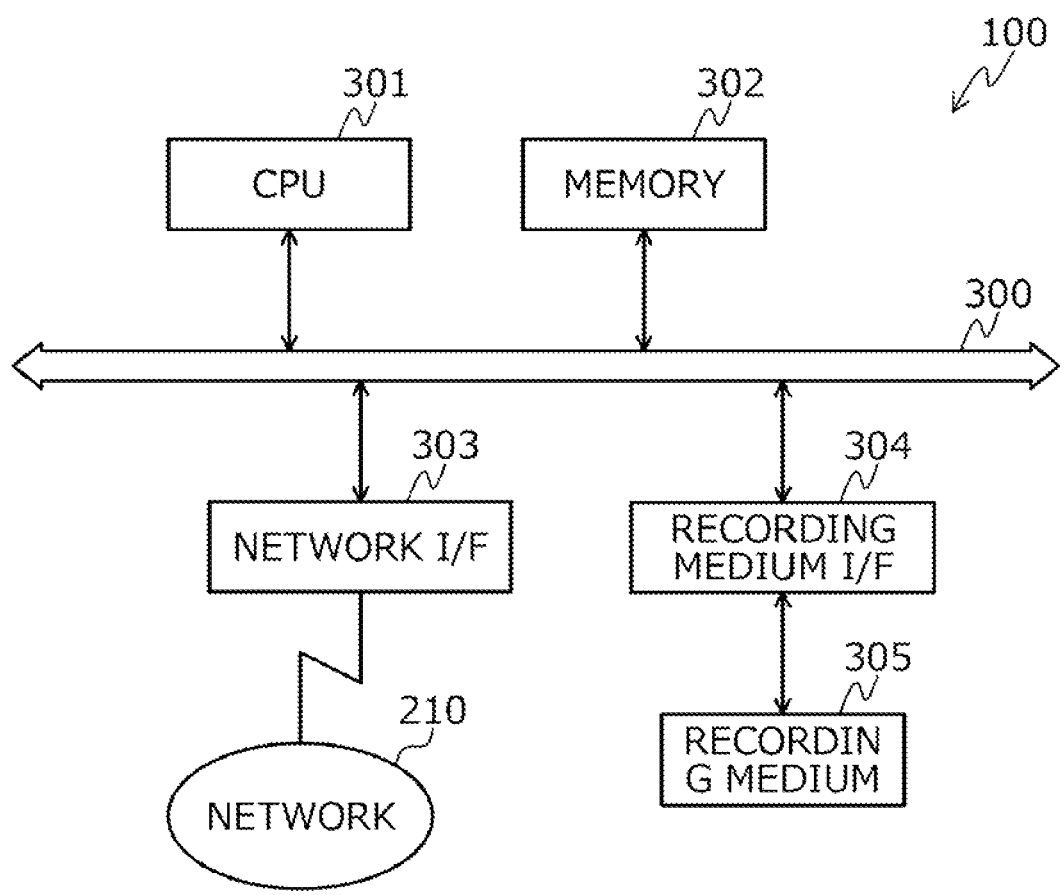
FIG. 3 is a block diagram illustrating a hardware configuration example of an information processing device 100.

FIG. 3 is a block diagram illustrating a hardware configuration example of the information processing device 100. In FIG. 3, the information processing device 100 includes a central processing unit (CPU) 301, a memory 302, a network interface (I/F) 303, a recording medium I/F 304, and a recording medium 305. Furthermore, the individual components are connected to each other by a bus 300.

Here, the CPU 301 is in charge of overall control of the information processing device 100. For example, the memory 302 includes a read only memory (ROM), a random access memory (RAM), a flash ROM, and the like. Specifically, for example, the flash ROM or the ROM stores various programs, and the RAM is used as a work area for the CPU 301. The programs stored in the memory 302 are loaded into the CPU 301 to cause the CPU 301 to execute coded processing.

The network I/F 303 is connected to the network 210 through a communication line and is connected to another computer via the network 210. Then, the network I/F 303 is in charge of an interface between the network 210 and the inside and controls input and output of data to and from another computer. For example, the network I/F 303 is a modem, a LAN adapter, or the like.

The recording medium I/F 304 controls reading and writing of data from and to the recording medium 305 under the control of the CPU 301. For example, the recording medium I/F 304 is a disk drive, a solid state drive (SSD), a universal serial bus (USB) port, or the like. The recording medium 305 is a nonvolatile memory that stores data written under the control of the recording medium I/F 304. For example, the recording medium 305 is a disk, a semiconductor memory, a USB memory, or the like. The recording medium 305 may also be attachable to and detachable from the information processing device 100.

For example, the information processing device 100 may also include a keyboard, a mouse, a display, a printer, a scanner, a microphone, a speaker, or the like in addition to the components described above. Furthermore, the information processing device 100 may also include a plurality of the recording medium I/Fs 304 and the recording media 305. Furthermore, the information processing device 100 does not need to include the recording medium I/F 304 or the recording medium 305.

(Content Stored in Knowledge DB 400)

Next, an example of content stored in a knowledge DB 400 will be described with reference to FIG. 4. The knowledge DB 400 is implemented by, for example, a storage region such as the memory 302 or the recording medium 305 of the information processing device 100 illustrated in FIG. 3.

Figure 4:
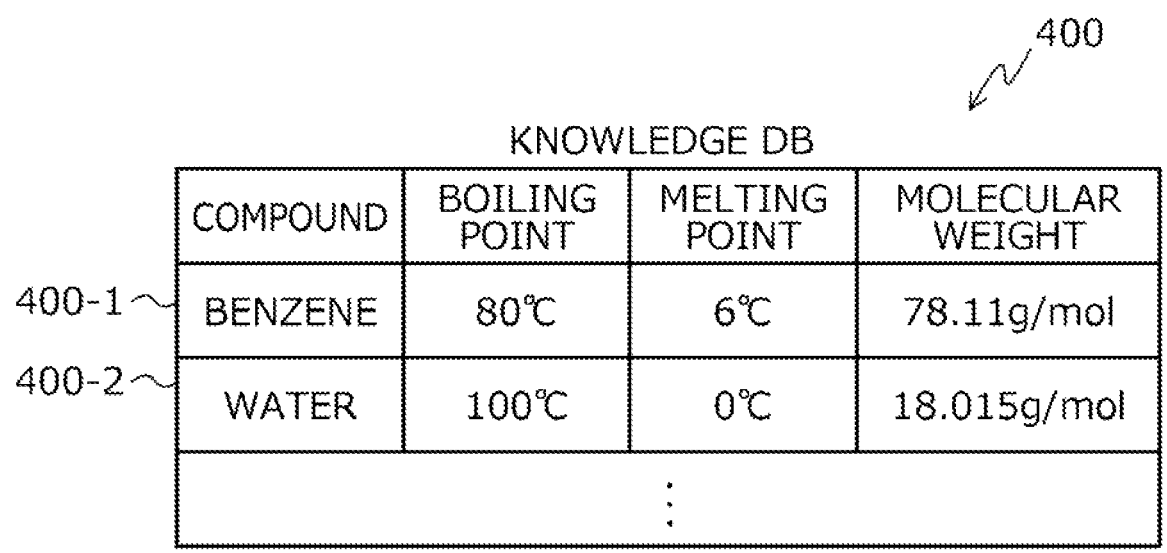
FIG. 4 is an explanatory diagram illustrating an example of content stored in a knowledge DB 400.

FIG. 4 is an explanatory diagram illustrating an example of content stored in the knowledge DB 400. As illustrated in FIG. 4, the knowledge DB 400 includes fields of a compound, a boiling point, a melting point, and a molecular weight. In the knowledge DB 400, compound information is stored as a record 400-a by setting information to each field for each compound. The letter a is an arbitrary integer. In the example in FIG. 4, a is an arbitrary integer of one or two.

A name of a compound is set to the field of the compound. A boiling point of a compound is set to the field of the boiling point. A melting point of a compound is set to the field of the melting point. A molecular weight of a compound is set to the field of the molecular weight. The boiling point, the melting point, the molecular weight, or the like that are the names of the fields can be used as a name indicating a relationship between a compound and a numerical value. The knowledge DB 400 may also include a field of a physical property value other than the boiling point, the melting point, and the molecular weight.

(Content Stored in Relationship DB 500)

Next, an example of content stored in a relationship DB 500 will be described with reference to FIG. 5. The relationship DB 500 is implemented by, for example, a storage region such as the memory 302 or the recording medium 305 of the information processing device 100 illustrated in FIG. 3.

FIG. 5 is an explanatory diagram illustrating an example of content stored in the relationship DB 500. As illustrated in FIG. 5, the relationship DB 500 includes fields of a relationship and a word. In the relationship DB 500, unit rule information is stored as a record 500-b by setting information to each field for each relationship. The letter b is an arbitrary integer. In the example in FIG. 5, b is an arbitrary integer of one to three.

In the field of the relationship, a name indicating a relationship between words is set. The name indicating the relationship is, for example, a boiling point, a melting point, a molecular weight, or the like. In the field of the word, a list of units that may be assigned to one word of a word pair is set in a case where the word pair has a predetermined relationship. The one word is, for example, a numerical value. The relationship DB 500 may also be created by, for example, extracting the name of the field of the knowledge DB 400 that is adopted as the name indicating the relationship and the word indicating the unit from the knowledge DB 400. The name of the field is, for example, a boiling point, a melting point, an atomic weight, or the like.

Here, a case has been described where the name indicating the relationship between the words is set to the field of the relationship. However, the embodiment is not limited to this. For example, there may also be a case where the word pair having the predetermined relationship is set to the field of the relationship. In this case, in the field of the word, a list of units corresponding to the predetermined relationship that may be assigned to one word of the word pair having the predetermined relationship is set.

(Hardware Configuration Example of Client Device 201)

Since the hardware configuration example of the client device 201 is similar to the hardware configuration example of the information processing device 100 illustrated in FIG. 3, the description thereof will be omitted.

(Functional Configuration Example of Information Processing Device 100)

Next, a functional configuration example of the information processing device 100 will be described with reference to FIG. 6.

Figure 6:
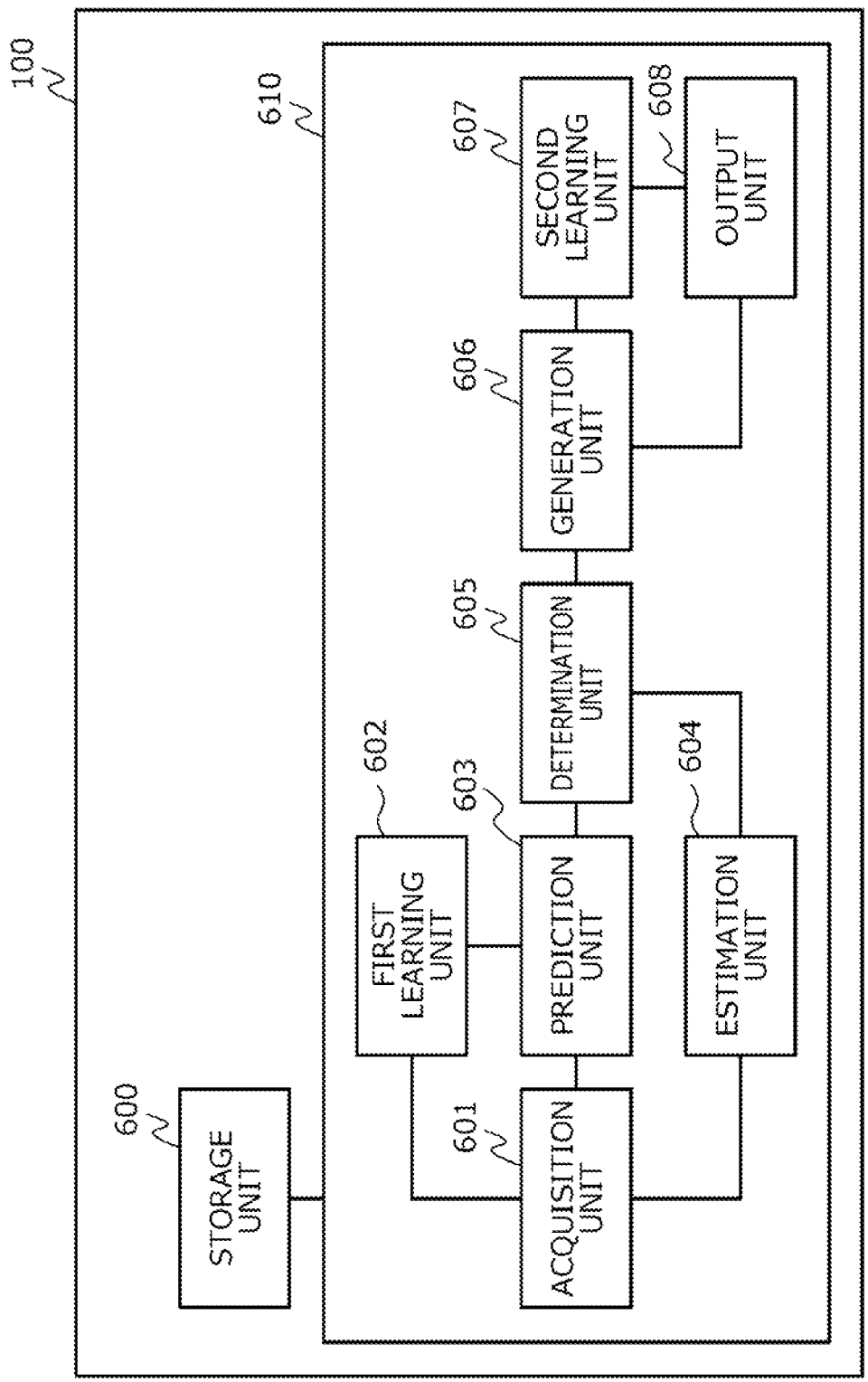
FIG. 6 is a block diagram illustrating a functional configuration example of the information processing device 100.

FIG. 6 is a block diagram illustrating a functional configuration example of the information processing device 100. The information processing device 100 includes a storage unit 600, an acquisition unit 601, a first learning unit 602, a prediction unit 603, an estimation unit 604, a determination unit 605, a generation unit 606, a second learning unit 607, and an output unit 608.

The storage unit 600 is implemented by, for example, the storage region such as the memory 302 or the recording medium 305 illustrated in FIG. 3. Hereinafter, a case will be described where the storage unit 600 is included in the information processing device 100. However, the embodiment is not limited to this. For example, there may also be a case where the storage unit 600 is included in a device different from the information processing device 100 and the information processing device 100 can refer to the content stored in the storage unit 600.

The acquisition unit 601 to the output unit 608 function as an example of a control unit 610. Specifically, for example, the acquisition unit 601 to the output unit 608 implement functions thereof by causing the CPU 301 to execute a program stored in the storage region of the memory 302, the recording medium 305, or the like illustrated in FIG. 3 or by the network I/F 303. A processing result of each functional unit is stored in the storage region such as the memory 302 or the recording medium 305 illustrated in FIG. 3, for example.

The storage unit 600 stores various types of information to be referred to or updated in the processing of each functional unit. The storage unit 600 stores the rule regarding the unit corresponding to the corresponding relationship in association with each relationship between words. The unit is added immediately before or immediately after a specific word. The specific word is, for example, a numerical value. For example, the storage unit 600 stores a word "° C.", "° F.", "K", or the like used as a unit in a case where the relationship "boiling point" is between the words in association with the relationship "boiling point" between the words. Specifically, for example, the storage unit 600 stores the relationship DB 500 illustrated in FIG. 5. As a result, the storage unit 600 can specify the unit on the basis of the relationship between the words.

The storage unit 600 stores the rule regarding the unit corresponding to the relationship of the corresponding word pair in association with each word pair. For example, the storage unit 600 stores a word pair "water" and "100" in association with a word "° C.", "° F.", "K", or the like used as a unit in a case where the word pair has a relationship "boiling point". As a result, the storage unit 600 can specify the unit on the basis of the relationship between the words.

The storage unit 600 stores correspondence information in which a word pair is associated with a relationship of the word pair. The storage unit 600 stores, for example, correspondence information in which the relationship of the word pair "boiling point" is associated with the word pair of "water" and "100". Specifically, for example, the storage unit 600 stores the knowledge DB 400 illustrated in FIG. 4. As a result, the storage unit 600 can specify the relationship of the word pair.

The storage unit 600 stores a prediction model. The prediction model is a model that predicts a word that appears immediately before or immediately after an input word. The prediction model is, for example, a model that predicts a unit that appears immediately before or immediately after the input word. Specifically, for example, the prediction model is a neural network. The prediction model is learned, for example, by the first learning unit 602. The prediction model may also be preset by a user, for example. As a result, the storage unit 600 can predict the word that appears immediately before or immediately after the input word.

The storage unit 600 stores a discrimination model. The discrimination model is a model that discriminates a relationship between any words in an input sentence. Specifically, for example, the discrimination model is a model that discriminates a relationship between a name of a compound and a numerical value. Furthermore, specifically, for example, the discrimination model may also be a model that discriminates a relationship between a name of a place and a numerical value. Furthermore, specifically, for example, the discrimination model may also be a model that discriminates a relationship between a name of an organization and a numerical value.

Furthermore, specifically, for example, the discrimination model may also be a model that discriminates a relationship between a name of a person and a numerical value. Furthermore, specifically, for example, the discrimination model may also be a model that discriminates a relationship between a name of a person and a name of a place. Furthermore, specifically, for example, the discrimination model may also be a model that discriminates a relationship between names of two places. For example, the discrimination model is learned by the second learning unit 607. As a result, the storage unit 600 can discriminate the relationship between the words.

The acquisition unit 601 acquires various types of information to be used for the processing of each functional unit. The acquisition unit 601 stores the acquired various types of information in the storage unit 600 or outputs the acquired various types of information to each functional unit. Furthermore, the acquisition unit 601 may also output the various types of information stored in the storage unit 600 to each functional unit. The acquisition unit 601 acquires the various types of information on the basis of, for example, an operation input of a user. The acquisition unit 601 may also receive various types of information from a device different from the information processing device 100, for example.

The acquisition unit 601 acquires a sentence. The sentence is written, for example, in Japanese. The sentence may also be written in a language other than Japanese, for example. The sentence is written, for example, in natural language. The sentence may also be written, for example, in a language other than the natural language.

The acquisition unit 601 acquires, for example, one or more first sentences to be samples used to predict a unit. The first sentence is used by the first learning unit 602. Specifically, for example, the acquisition unit 601 acquires the first sentence by receiving the first sentence from the client device 201. The acquisition unit 601 may also acquire the first sentence on the basis of the operation input of the user. This makes it possible for the acquisition unit 601 to learn the prediction model.

The acquisition unit 601 acquires, for example, one or more second sentences to be samples used to discriminate a relationship. The second sentence is used by the prediction unit 603, the estimation unit 604, the determination unit 605, the generation unit 606, and the second learning unit 607. Specifically, for example, the acquisition unit 601 acquires the second sentence by receiving the second sentence from the client device 201. The acquisition unit 601 may also acquire the second sentence on the basis of an operation input of a user. This makes it possible for the acquisition unit 601 to learn the discrimination model.

The acquisition unit 601 may also accept a start trigger to start processing of any one of functional units. The start trigger is, for example, to perform a predetermined operation input by the user. The start trigger may also be, for example, receipt of predetermined information from another computer.

For example, the acquisition unit 601 accepts the acquisition of the first sentence as a start trigger to start processing of the first learning unit 602. For example, the acquisition unit 601 accepts the acquisition of the second sentence as a start trigger used to start processing of the prediction unit 603, the estimation unit 604, the determination unit 605, the generation unit 606, and the second learning unit 607. As a result, the acquisition unit 601 can make each functional unit start processing.

The first learning unit 602 learns the prediction model. The first learning unit 602 learns the prediction model on the basis of first learning data. The first learning data associates a word string to be input data with correct answer data indicating a word that appears immediately before or immediately after one word in the word string.

The first learning unit 602 determines whether or not the acquired one word in the first sentence is a unit on the basis of the rule stored in the storage unit 600, for example. In a case of determining that the word is a unit, the first learning unit 602 generates the first learning data in which a word string excluding the word that is determined as a unit, in the acquired first sentence, is associated with correct answer data indicating the word determined as a unit. The first learning unit 602 learns the prediction model on the basis of the generated first learning data.

Specifically, for example, the first learning unit 602 updates a parameter of the neural network so that output data of the neural network corresponding to input data of the generated first learning data matches the correct answer data of the generated first learning data. The first learning unit 602 sets the updated neural network to the prediction model. As a result, the first learning unit 602 can predict a word that appears immediately before or immediately after a word in the second sentence.

The prediction unit 603 specifies the word that appears immediately before or immediately after the first word in the acquired second sentence, using the prediction model. The first word is, for example, a word to which a unit is added. The first word is, for example, a numerical value. The first word may also be, for example, a name of a place, an organization, a person, or the like. For example, by inputting one or more words immediately before the first word in the acquired second sentence to the prediction model in sequence, the prediction unit 603 specifies the word that appears immediately before or immediately after the first word in the acquired second sentence.

The estimation unit 604 estimates a relationship between the first word and the second word on the basis of the correspondence information stored in the storage unit 600. The first word is, for example, a numerical value. The second word is, for example, a name of a compound, a name of a place, a name of an organization, a name of a person, or the like. The first word may also be, for example, a name of a place. The first word appears, for example, after the second word in the acquired second sentence. The first word may also appear, for example, before the second word in the acquired second sentence. For example, the estimation unit 604 estimates the relationship "boiling point" between the first word "100" and the second word "water" with reference to the knowledge DB 400 illustrated in FIG. 4. As a result, the estimation unit 604 can refer to the relationship between the words.

The determination unit 605 determines whether or not the estimated relationship between the first word and the second word in the second sentence is appropriate on the basis of the specified word and the rule stored in the storage unit 600. The determination unit 605 acquires a unit corresponding to the estimated relationship between the first word and the second word, for example, on the basis of the estimated relationship between the first word and the second word and the rule. Here, in a case where the specified word matches the acquired unit, the determination unit 605 determines that the estimated relationship between the first word and the second word is appropriate. On the other hand, in a case where the specified word does not match the acquired unit, the determination unit 605 determines that the estimated relationship between the first word and the second word is not appropriate. As a result, the determination unit 605 can determine whether or not it is preferable to use the estimated relationship between the first word and the second word to learn the discrimination model.

In a case where the word that appears immediately before or immediately after the first word is not specified, the determination unit 605 determines that the estimated relationship between the first word and the second word is not appropriate. As a result, the determination unit 605 can grasp that it is not preferable to use the estimated relationship between the first word and the second word to learn the discrimination model.

In a case of determining that the relationship is appropriate, the generation unit 606 generates second learning data in which the acquired second sentence to be input data is associated with the correct answer data indicating the estimated relationship between the first word and the second word. As a result, the generation unit 606 can learn the discrimination model.

In a case of determining that the relationship is appropriate, the generation unit 606 generates information regarding the estimated relationship between the first word and the second word. For example, the generation unit 606 generates output information indicating the estimated relationship between the first word and the second word so that the first word and the second word can be specified, in association with the acquired second sentence. The generation unit 606 may also generate, for example, output information indicating the estimated relationship between the first word and the second word. As a result, the generation unit 606 can grasp the estimated relationship between the first word and the second word.

The second learning unit 607 learns the discrimination model on the basis of the generated second learning data. For example, the second learning unit 607 updates a parameter of the neural network so that output data of the neural network corresponding to input data of the generated second learning data matches correct answer data of the generated second learning data. The second learning unit 607 sets the updated neural network to the discrimination model. As a result, the second learning unit 607 can discriminate the relationship between the words.

The output unit 608 outputs a processing result of any one of the functional units. An output format is, for example, display on a display, print output to a printer, transmission to an external device by the network I/F 303, or storage in the storage region such as the memory 302 or the recording medium 305. Thus, the output unit 608 makes it possible to notify the user of the processing result of any one of the functional units, and may improve convenience of the information processing device 100.

The output unit 608 outputs, for example, the information regarding the estimated relationship between the first word and the second word. Specifically, for example, the output unit 608 outputs the output information indicating the estimated relationship between the first word and the second word so that the first word and the second word can be specified, in association with the acquired second sentence. As a result, the output unit 608 can grasp the estimated relationship between the first word and the second word. The output unit 608 outputs, for example, the discrimination model. As a result, the output unit 608 can discriminate the relationship between the words.

Here, a case has been described where the information processing device 100 includes the acquisition unit 601 to the output unit 608. However, the embodiment is not limited to this. For example, there may also be a case where the information processing device 100 does not include any one of the functional units. For example, there may also be a case where the information processing device 100 does not learn the discrimination model by the information processing device 100, and the information processing device 100 does not need to include the first learning unit 602. Furthermore, for example, there may also be a case where the information processing device 100 does not generate the discrimination model by the information processing device 100, and the information processing device 100 does not need to include the second learning unit 607.

Furthermore, for example, there may also be a case where the information processing device 100 does not specify the word that appears immediately before or immediately after the first word by the information processing device 100, and the information processing device 100 does not need to include the first learning unit 602 and the prediction unit 603. In this case, the acquisition unit 601 may also acquire a result of predicting the word that appears immediately before or immediately after the first word by another computer. Furthermore, for example, there may also be a case where the information processing device 100 does not estimate the relationship between the first word and the second word by the information processing device 100, and the information processing device 100 does not need to include the estimation unit 604. In this case, the acquisition unit 601 may also acquire a result of estimating the relationship between the first word and the second word by another computer.

(Example of Sentence Analysis System 200)

Next, an example of the sentence analysis system 200 will be described with reference to FIGS. 7 to 10. First, a flow of an operation performed by the information processing device 100 in the example of the sentence analysis system 200 will be described with reference to FIG. 7.

Figure 7:
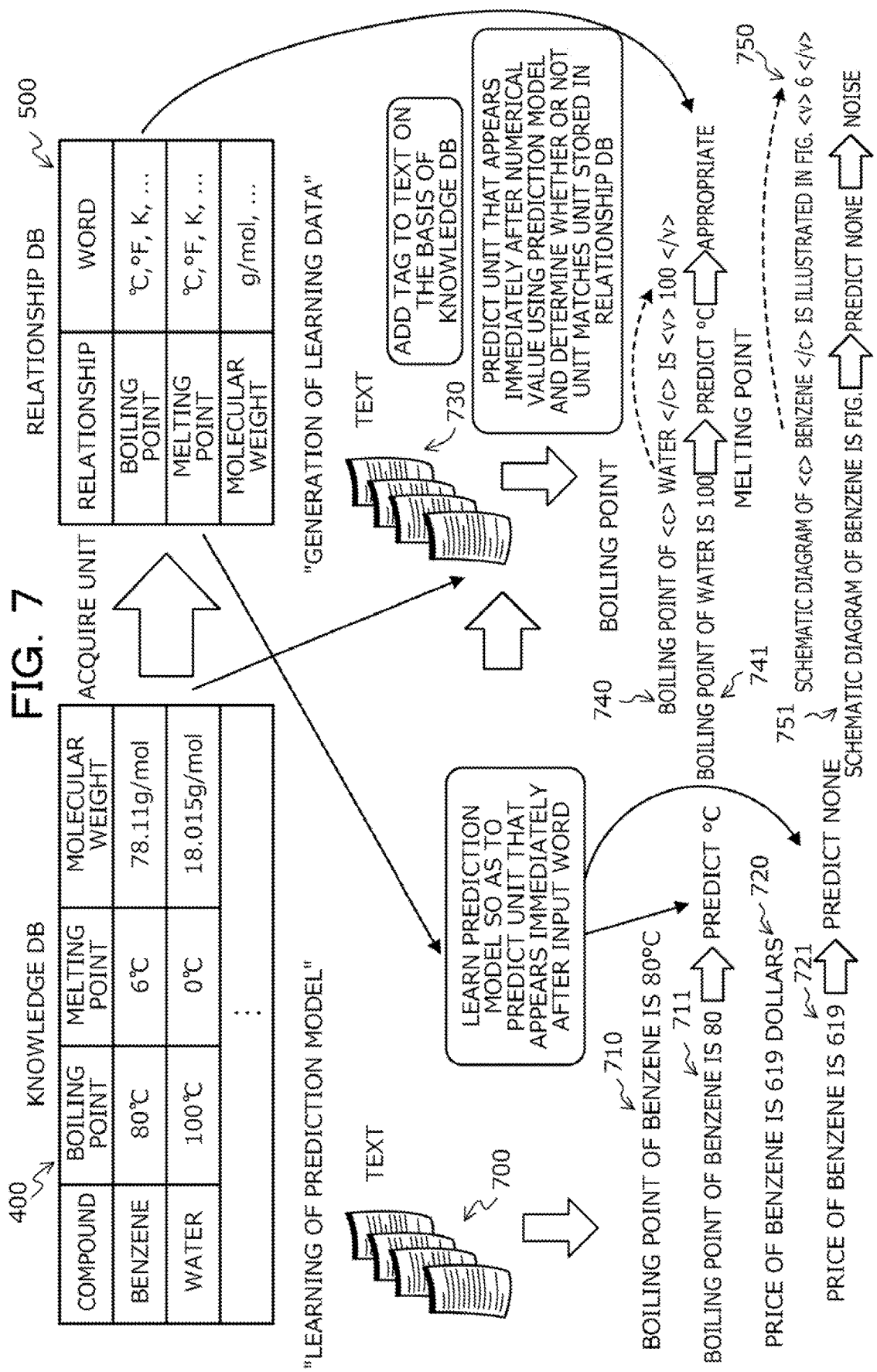
FIG. 7 is an explanatory diagram illustrating a flow of an operation performed by the information processing device 100.

FIG. 7 is an explanatory diagram illustrating the flow of the operation performed by the information processing device 100. In FIG. 7, (7-1) the Information processing device 100 generates the relationship DB 500 on the basis of the knowledge DB 400. The information processing device 100 extracts, for example, a boiling point, a melting point, and a molecular weight as names indicating a relationship between a compound and a numerical value from the knowledge DB 400 and extracts a unit added to the numerical value indicating the boiling point, the melting point, and the molecular weight. Then, the information processing device 100 generates the relationship DB 500 on the basis of the extracted information.

(7-2) The information processing device 100 learns a prediction model on the basis of a text group 700 including a text in which the numerical value with the unit is described. The prediction model is, for example, a recurrent neural network (RNN) that predicts a word that appears immediately after an input word. The RNN is, for example, a long short term memory (LSTM) format. The text group 700 includes, for example, texts 710 and 720 or the like.

For example, the information processing device 100 learns the prediction model so as to output a word "° C." that is a unit following a pre-stage part 711 in response to an input of the pre-stage part 711 in the text 710 on the basis of the text 710.

Furthermore, for example, the information processing device 100 learns the prediction model so as to output "NONE", indicating that a word to be a unit following a pre-stage part 721 does not exist, in response to an input of the pre-stage part 721 in the text 720 on the basis of the text 720.

Here, for example, the information processing device 100 may also learn the prediction model so as to output a word "dollar" to be a unit following the pre-stage part 721 in response to the input of the pre-stage part 721 in the text 720 on the basis of the text 720. Details of learning the prediction model by the information processing device 100 will be specifically, for example, described later with reference to FIG. 8.

(7-3) The information processing device 100 generates learning data used to learn a discrimination model on the basis of a text group 730 including a text in which a numerical value with no unit is described. For example, the information processing device 100 adds a tag to each text in the text group 730 on the basis of the knowledge DB 400.

The tag is, for example, a "<c> name of a compound </c>" added to a name of a compound, a "<v> numerical value </v>" added to a numerical value, or the like. Specifically, for example, the information processing device 100 generates texts 740 and 750 to which tags are added. Details of adding the tag by the information processing device 100 will be specifically, for example, described later with reference to FIG. 9.

(7-4) The information processing device 100 estimates a relationship between the name of the compound and the numerical value in the text to which the tag is added on the basis of the knowledge DB 400 and acquires a unit corresponding to the estimated relationship on the basis of the relationship DB 500. Next, the information processing device 100 predicts a unit that appears immediately after the numerical value in the text to which the tag is added, using the learned prediction model.

Then, if the acquired unit matches the predicted unit, the information processing device 100 determines that the estimated relationship is appropriate. If the acquired unit does not match the predicted unit, the information processing device 100 determines that the estimated relationship is a noise and is not appropriate.

For example, the information processing device 100 estimates a relationship "boiling point" between water and 100 in the text 740 to which a tag is added and acquires a unit "° C." corresponding to the relationship "boiling point". Next, the information processing device 100 predicts the unit "° C." that appears immediately after the numerical value on the basis of a pre-stage part 741 before the numerical value in the text 740 to which the tag is added, using the prediction model.

Then, because the acquired unit "° C." matches the predicted unit "° C.", the information processing device 100 determines that the estimated relationship "boiling point" between water and 100 is appropriate. As a result, the information processing device 100 can generate appropriate learning data when the discrimination model is learned, from the text 740 including the word pair of water and 100 having the appropriate relationship "boiling point".

Furthermore, for example, the information processing device 100 estimates a relationship "melting point" between benzene and six in the text 750 to which a tag is added and acquires a unit "° C." corresponding to the relationship "melting point". Next, the information processing device 100 acquires a result "NONE" indicating that a unit that appears immediately after a numerical value does not exist, on the basis of a pre-stage part 751 before the numerical value in the text 750 to which a tag is added, using the prediction model.

Then, because the predicted result "NONE" does not match the acquired unit "° C.", the information processing device 100 determines that the estimated relationship "melting point" between benzene and six is a noise and is not appropriate. As a result, the information processing device 100 can prevent inappropriate learning data from being generated when the discrimination model is learned, from the text 750 including the word pair of benzene and six having the inappropriate relationship "melting point". Details of generating learning data by the information processing device 100 will be specifically, for example, described later with reference to FIG. 10.

Next, details of learning the prediction model by the information processing device 100 will be described with reference to FIG. 8.

Figure 8:
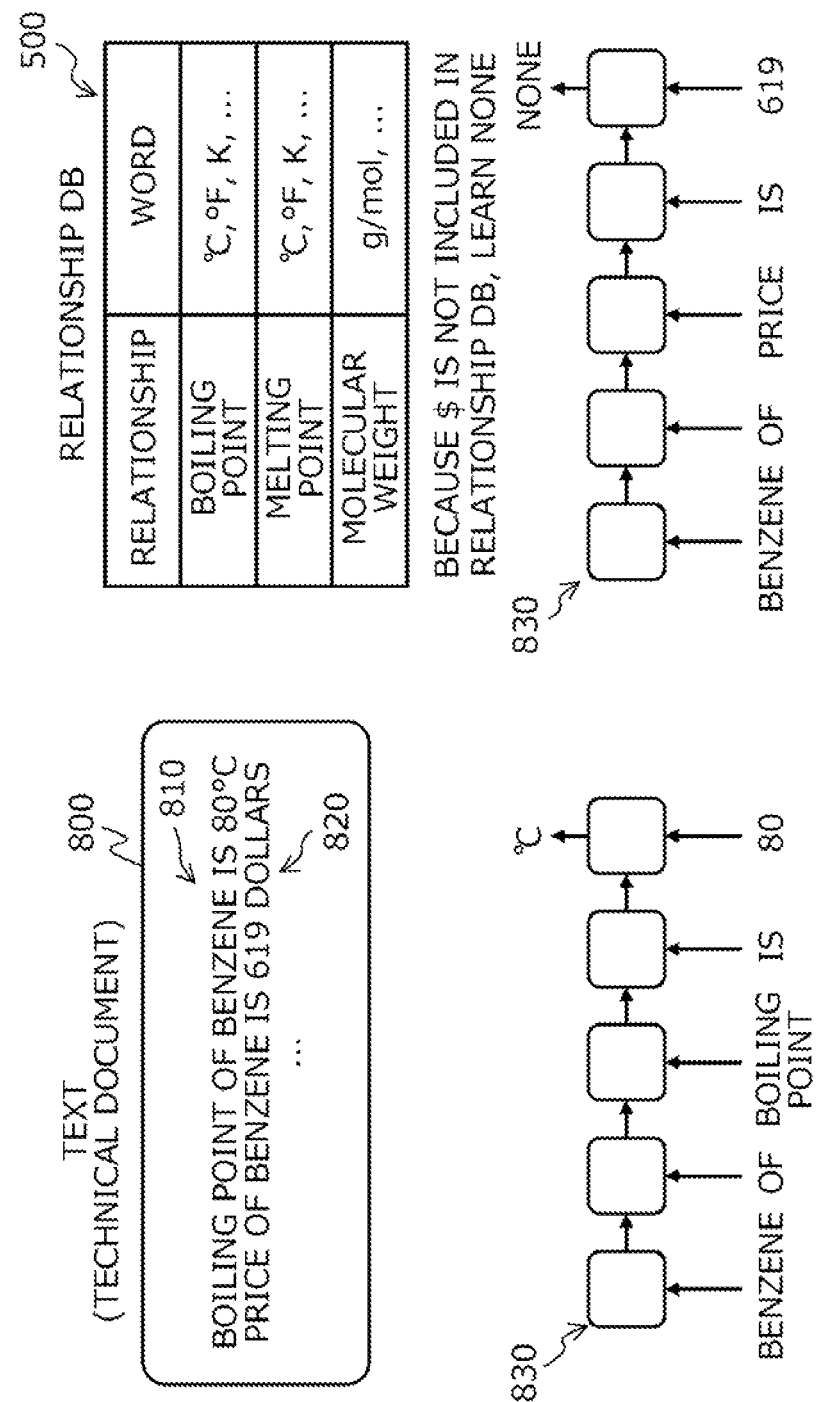
FIG. 8 is an explanatory diagram illustrating details of learning of a prediction model.

FIG. 8 is an explanatory diagram illustrating the details of learning the prediction model. In FIG. 8, (8-1) the information processing device 100 acquires a text group 800. The text group 800 includes, for example, a technical document relating the chemistry field. The text group 800 includes, for example, a text 810 "the boiling point of benzene is 80° C.", a text 820 "a price of benzene is 619 dollars", or the like.

(8-2) Because the unit "° C." that appears in the text 810 "the boiling point of benzene is 80° C." is a unit that exists in the relationship DB 500, the information processing device 100 adopts the unit "° C." as correct answer data of prediction. Next, the information processing device 100 performs morphological analysis on the text 810 "the boiling point of benzene is 80° C.". Then, in a case where each element from the head element "benzene" to the numerical value element "80" is input to an unlearned RNN 830 in order, the information processing device 100 updates parameters of the RNN 830 so that the unit "° C." that is the correct answer data is output from the RNN 830.

(8-3) Because the unit "dollar" that appears in the text 820 "a price of benzene is 619 dollars" is not a unit that exists in the relationship DB 500, the information processing device 100 adopts "NONE", not the unit "dollar" as the correct answer data of prediction. Next, the information processing device 100 performs morphological analysis on the text 820 "a price of benzene is 619 dollars". Then, in a case where each element from the head element "benzene" to the numerical value element "619" is input to the unlearned RNN 830 in order, the information processing device 100 updates parameters of the RNN 830 so that "NONE" that is the correct answer data is output from the RNN 830.

After updating the parameter of the RNN 830 on the basis of each text of the text group 800, the information processing device 100 sets the updated RNN 830 as the learned RNN 830. As a result, the information processing device 100 can acquire the learned RNN 830 to be a prediction model.

Next, details of adding a tag by the information processing device 100 will be described with reference to FIG. 9.

Figure 9:
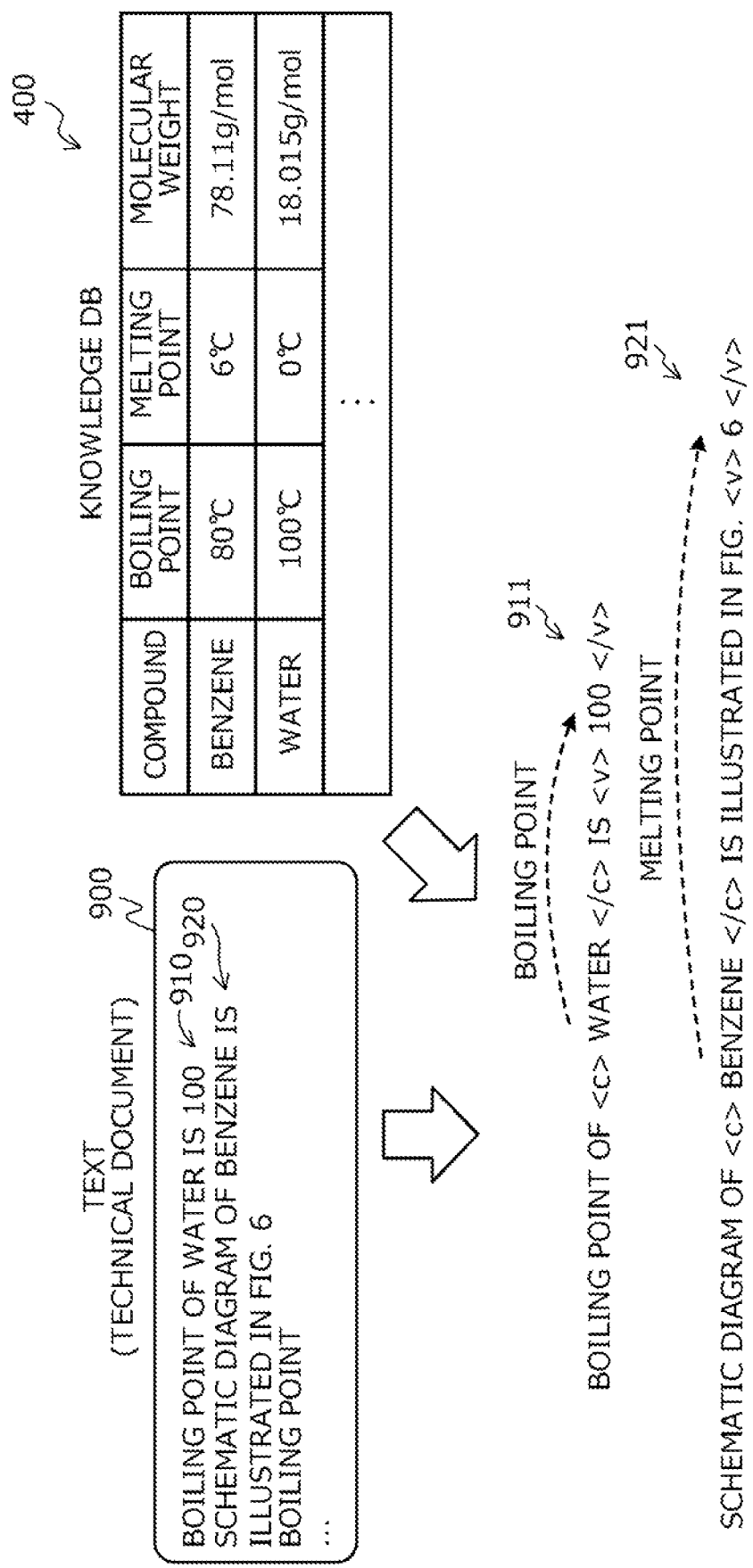
FIG. 9 is an explanatory diagram illustrating details of adding a tag.

FIG. 9 is an explanatory diagram illustrating details of adding a tag. In FIG. 9, (9-1) the information processing device 100 acquires a text group 900. The text group 900 includes, for example, a technical document relating to the chemistry field. For example, the text group 900 includes a text 910 "the boiling point of water is 100", a text 920 "the schematic diagram of benzene is illustrated in FIG. 6", or the like.

(9-2) The information processing device 100 adds a tag if a name of a compound and a numerical value stored in the knowledge DB 400 are included in the text. Furthermore, when the tag is added, specification of a range can be added. The range is a range in which the name of the compound and the numerical value are searched. The range is, for example, a fixed range. The fixed range is, for example, a distance between words, and specifically, for example, the number of characters. The fixed range is, for example, a predetermined delimiter and may be also, specifically, for example, a range in one sentence. Furthermore, the information processing device 100 estimates a relationship between a name of a compound and a numerical value to which tags are added, on the basis of the knowledge DB 400.

The information processing device 100 determines that, in the text 910 "the boiling point of water is 100", the word pair of water and 100 stored in the knowledge DB 400 is included in one sentence. Therefore, the information processing device 100 adds tags to water and 100 and saves a text 911 "the boiling point of <c> water </c> is <v>100</v>". Furthermore, the information processing device 100 estimates the relationship "boiling point" between water and 100 on the basis of the knowledge DB 400 and saves the relationship in association with the text 911 "the boiling point of <c> water </c> is <v>100</v>".

Furthermore, the information processing device 100 determines that a word pair of benzene and six stored in the knowledge DB 400 is included in one sentence, in the text 920 "the schematic diagram of benzene is illustrated in FIG. 6". Therefore, the information processing device 100 adds tags to benzene and six and saves a text 921 "the schematic diagram of <c> benzene </c> is illustrated in FIG. <v>6</v>". Furthermore, the information processing device 100 estimates the relationship "melting point" between benzene and six on the basis of the knowledge DB 400 and saves the estimated relationship in association with the text 921 "the schematic diagram of <c> benzene </c> is illustrated in FIG. <v>6</v>".

Next, details of generating learning data by the information processing device 100 will be described with reference to FIG. 10.

FIG. 10 is an explanatory diagram illustrating details of generating learning data. In FIG. 10, (10-1) the information processing device 100 determines whether or not an estimated relationship of a word pair in a text to which a tag is added is appropriate. In the example in FIG. 10, an example of the text to which the tag is added includes the texts 911 and 921 illustrated in FIG. 9. Furthermore, an example of the prediction model is the learned RNN 830 illustrated in FIG. 8.

For example, the information processing device 100 acquires a unit "° C." corresponding to the estimated relationship "boiling point" between water and 100 on the basis of the relationship DB 500. Next, the information processing device 100 performs morphological analysis on the text 911 "the boiling point of <c> water </c> is <v>100</v>" as excluding tags. Then, the information processing device 100 inputs each element from the head element "water" to the numerical value element "100" to the learned RNN 830 in order and acquires the unit "° C." that is output data.

Here, because the unit "° C." corresponding to the estimated relationship "boiling point" between water and 100 matches the unit "° C." that is the output data, the information processing device 100 determines that the estimated relationship "boiling point" between water and 100 is appropriate. Therefore, the information processing device 100 generates and saves learning data in which the relationship "boiling point" between water and 100 as the correct answer data is associated with the text 911 "the boiling point of <c> water </c> is <v>100</v>".

As a result, the information processing device 100 can generate the discrimination model. Furthermore, because the information processing device 100 can use the learning data based on the text including the word pair having an appropriate relationship, it is possible to enhance the discrimination accuracy of the discrimination model.

For example, the information processing device 100 acquires a unit "° C." corresponding to the estimated relationship "melting point" between benzene and six on the basis of the relationship DB 500. Next, the information processing device 100 performs morphological analysis on the text 921 "the schematic diagram of <c> benzene </c> is illustrated in FIG. <v>6</v>" as excluding tags. Then, the information processing device 100 inputs each element from the head element "benzene" to the numerical value element "6" to the learned RNN 830 in order and acquires the output data "NONE".

Here, because the unit "° C." corresponding to the estimated relationship "melting point" between benzene and six does not match the output data "NONE", the information processing device 100 determines that the estimated relationship "melting point" between benzene and six is a noise and is not appropriate. Therefore, the information processing device 100 does not generate learning data based on the text 921 "the schematic diagram of <c> benzene </c> is illustrated in FIG. <v>6</v>".

As a result, the information processing device 100 can prevent that a word pair that does not have an appropriate relationship is erroneously recognized as a word pair that has an appropriate relationship and can prevent that learning data based on a text including the word pair that does not have an appropriate relationship is used. Therefore, the information processing device 100 can suppress decrease in the discrimination accuracy of the learned discrimination model.

Here, a case has been described where the information processing device 100 estimates the relationship between the words and determines whether or not the estimated relationship between the words is appropriate. However, the embodiment is not limited to this. For example, there may also be a case where another computer generates information indicating a relationship between words in a text in association with the text. In this case, the information processing device 100 acquires the information indicating the relationship between the words in the text from the another computer and determines whether or not the relationship between the words is appropriate. Then, in a case where the relationship between the words is not appropriate, the information processing device 100 may also delete the information indicating the relationship between the words associated with the text.

(Overall Processing Procedure)

Next, an example of an overall processing procedure executed by the information processing device 100 will be described with reference to FIG. 11. The overall processing is implemented by, for example, the CPU 301, the storage region such as the memory 302 or the recording medium 305, and the network I/F 303 illustrated in FIG. 3.

Figure 11:
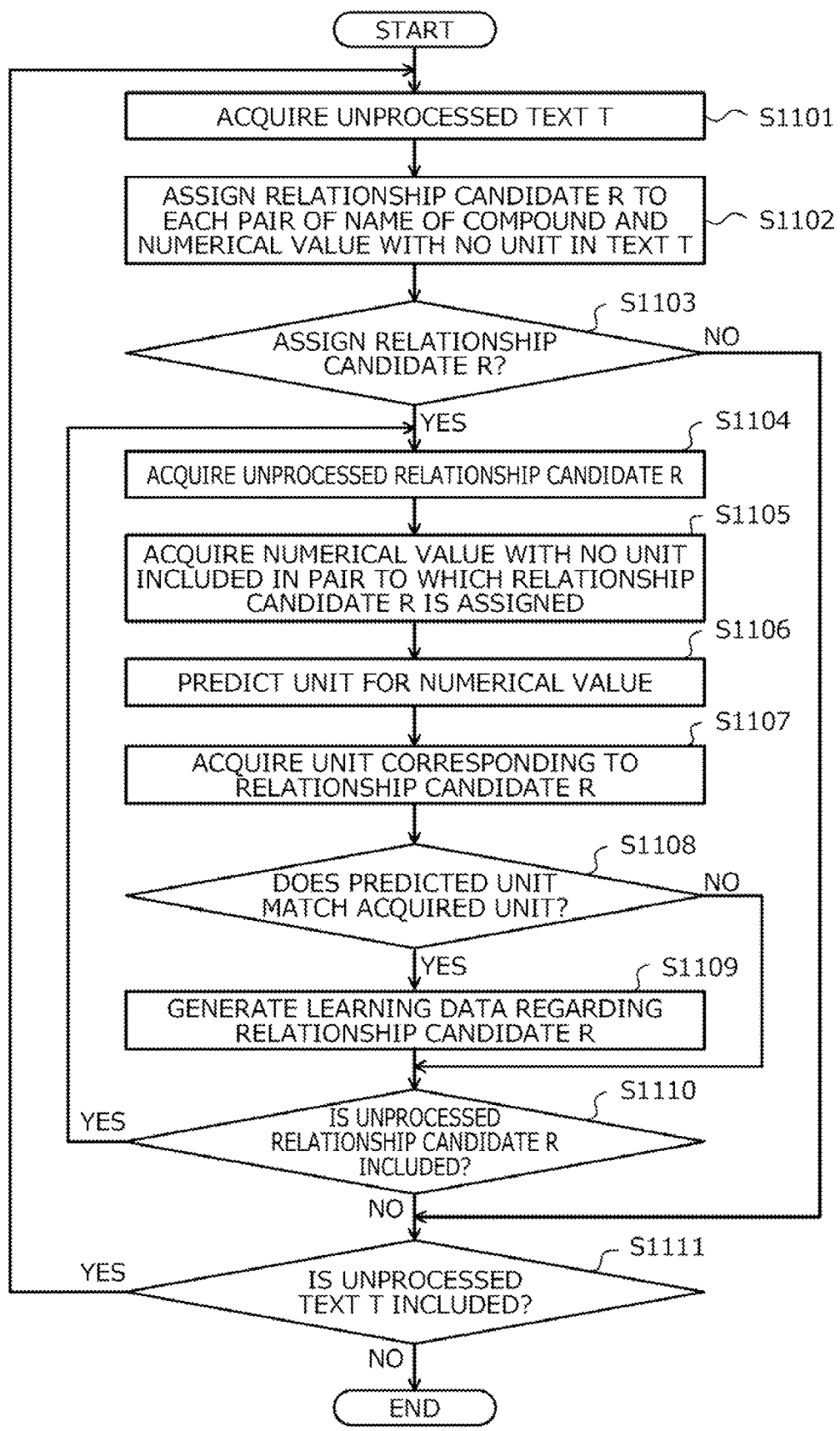
FIG. 11 is a flowchart illustrating an example of an overall processing procedure.

FIG. 11 is a flowchart illustrating an example of an overall processing procedure. In FIG. 11, the information processing device 100 acquires an unprocessed text T of a plurality of texts T (step S1101). Next, the information processing device 100 assigns a relationship candidate R to each pair of a name of a compound and a numerical value with no unit in the acquired text T with reference to the knowledge DB 400 (step S1102).

Then, the information processing device 100 determines whether or not the relationship candidate R is assigned (step S1103). Here, in a case where the relationship candidate R is not assigned (step S1103: No), the information processing device 100 proceeds the procedure to processing in step S1111. On the other hand, in a case where the relationship candidate R is assigned (step S1103: Yes), the information processing device 100 proceeds the procedure to processing in step S1104.

In step S1104, the information processing device 100 acquires an unprocessed relationship candidate R from among one or more assigned relationship candidates R (step S1104). Next, the information processing device 100 acquires the numerical value with no unit included in the pair to which the acquired relationship candidate R is assigned (step S1105). Then, the information processing device 100 predicts a unit for the acquired numerical value using the prediction model (step S1106).

Next, the information processing device 100 acquires a unit corresponding to the acquired relationship candidate R with reference to the relationship DB 500 (step S1107).

Then, the information processing device 100 determines whether or not the predicted unit matches the acquired unit (step S1108).

Here, in a case where the units do not match (step S1108: No), the information processing device 100 proceeds the procedure to processing in step S1110. At this time, a case where the predicted result is "NONE" indicating no unit is included in a case where the units do not match. On the other hand, in a case where the units match (step S1108: Yes), the information processing device 100 proceeds the procedure to processing in step S1109.

In step S1109, the information processing device 100 generates learning data regarding the acquired relationship candidate R on the basis of the acquired text T and saves the generated learning data (step S1109). Next, the information processing device 100 determines whether or not the one or more assigned relationship candidates R include an unprocessed relationship candidate R (step S1110).

Here, in a case where there is an unprocessed relationship candidate R (step S1110: Yes), the information processing device 100 returns the procedure to the processing in step S1104. On the other hand, in a case where there is no unprocessed relationship candidate R (step S1110: No), the information processing device 100 proceeds the procedure to processing in step S1111.

In step S1111, the information processing device 100 determines whether or not the plurality of texts T includes an unprocessed text T (step S1111). Here, in a case where there is an unprocessed text T (step S1111: Yes), the information processing device 100 returns the procedure to the processing in step S1101.

On the other hand, in a case where there is no unprocessed text T (step S1111: No) the information processing device 100 ends the overall processing. As a result, the information processing device 100 can generate the discrimination model. Furthermore, the information processing device 100 can enhance the discrimination accuracy of the discrimination model.

(Learning Processing Procedure)

Next, an example of a learning processing procedure performed by the information processing device 100 will be described with reference to FIG. 12. The learning processing is implemented by, for example, the CPU 301, the storage region such as the memory 302 or the recording medium 305, and the network I/F 303 illustrated in FIG. 3.

Figure 12:
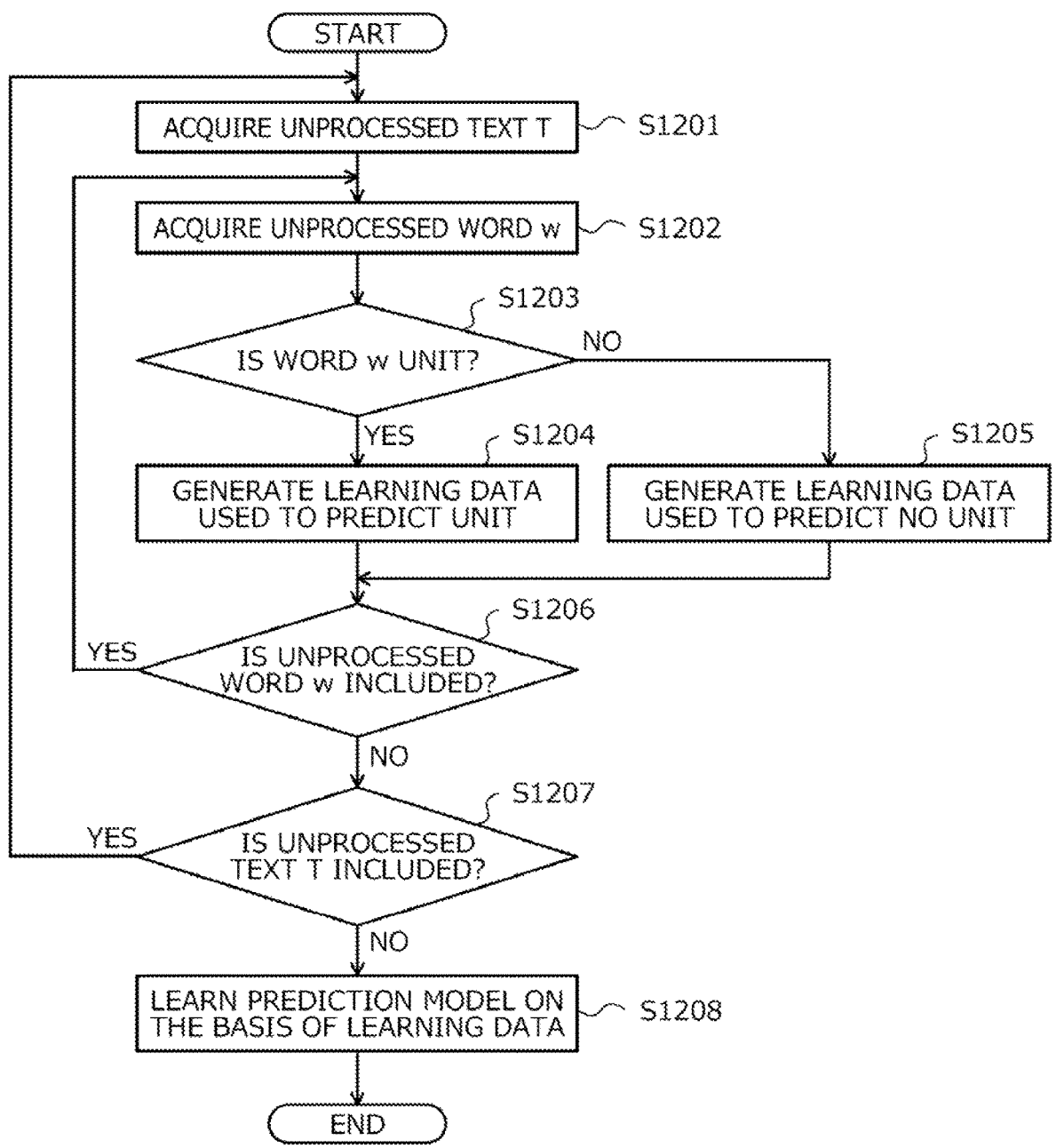
FIG. 12 is a flowchart illustrating an example of a learning processing procedure.

FIG. 12 is a flowchart illustrating an example of the learning processing procedure. In FIG. 12, the information processing device 100 acquires an unprocessed text T of a plurality of texts T (step S1201). Next, the information processing device 100 acquires an unprocessed word w in the acquired text T (step S1202).

Then, the information processing device 100 determines whether or not the acquired word w is a unit with reference to the relationship DB 500 (step S1203). Here, in a case where the word w is a unit (step S1203: Yes), the information processing device 100 proceeds the procedure to processing in step S1204. On the other hand, in a case where the word w is not a unit (step S1203: No), the information processing device 100 proceeds the procedure to processing in step S1205.

In step S1204, the information processing device 100 generates learning data used to predict a unit on the basis of the acquired text T and the acquired word w (step S1204). Then, the information processing device 100 proceeds the procedure to processing in step S1206.

In step S1205, the information processing device 100 generates learning data used to predict no unit on the basis of the acquired text T and the acquired word w (step S1205). Then, the information processing device 100 proceeds the procedure to processing in step S1206.

In step S1206, the information processing device 100 determines whether or not the acquired text T includes an unprocessed word w (step S1206). Here, in a case where an unprocessed word w is included (step S1206: Yes), the information processing device 100 returns the procedure to the processing in step S1202. On the other hand, in a case where an unprocessed word w is not included (step S1206: No), the information processing device 100 proceeds the procedure to processing in step S1207.

In step S1207, the information processing device 100 determines whether or not the plurality of texts T includes an unprocessed text T (step S1207). Here, in a case where there is an unprocessed text T (step S1207: Yes), the information processing device 100 returns the procedure to the processing in step S1201. On the other hand, in a case where there is no unprocessed text T (step S1207: No), the information processing device 100 proceeds the procedure to processing in step S1208.

In step S1208, the information processing device 100 learns the prediction model on the basis of the generated learning data (step S1208). Then, the information processing device 100 ends the learning processing. As a result, the information processing device 100 can learn the prediction model and predict the word that appears immediately after the input word. Furthermore, the information processing device 100 can suppress an increase in a workload of a user because learning data is automatically generated from the text T.

Here, the information processing device 100 may also change the order of the processing in some steps in the flowcharts in FIGS. 11 and 12 and execute the processing. For example, the order of the processing in steps S1106 and S1107 can be switched. Furthermore, for example, there may also be a case where the processing in step S1102 is executed after the processing in steps S1105 and S1106. Furthermore, the information processing device 100 may also omit the processing in some steps in the flowcharts in FIGS. 11 and 12. For example, the processing in steps S1203 and S1205 can be omitted.

As described above, according to the information processing device 100, a sentence can be acquired. According to the information processing device 100, it is possible to specify a word that appears immediately before or immediately after the first word in the acquired sentence by using the prediction model that predicts a word that appears immediately before or immediately after the input word. According to the information processing device 100, it is possible to determine whether or not the estimated relationship between the first word and the second word in the sentence is appropriate on the basis of the specified word and the rule regarding the unit corresponding to the relationship between the words stored in the storage unit. According to the information processing device 100, in a case of determining that the relationship is appropriate, information regarding the estimated relationship between the first word and the second word can be output. As a result, the information processing device 100 can use the sentence, including the word pair having the predetermined relationship that is determined as appropriate, that may be appropriate learning data used to learn the discrimination model and can generate appropriate learning data. Furthermore, the information processing device 100 can remove the sentence, including the word pair that does not have the predetermined relationship, that is determined as not appropriate and can prevent inappropriate learning data from being generated.

According to the information processing device 100, it is possible to acquire a unit corresponding to the estimated relationship between the first word and the second word on the basis of the estimated relationship between the first word and the second word and the rule. According to the information processing device 100, it is possible to determine that the estimated relationship between the first word and the second word is appropriate in a case where the specified word matches the acquired unit. According to the information processing device 100, it is possible to determine that the estimated relationship between the first word and the second word is not appropriate in a case where the specified word does not match the acquired unit. As a result, the information processing device 100 can accurately determine whether or not the estimated relationship is appropriate.

According to the information processing device 100, it is possible to determine that the estimated relationship between the first word and the second word is not appropriate in a case where the word that appears immediately before or immediately after the first word is not specified. As a result, the information processing device 100 can accurately determine that the estimated relationship is not appropriate.

According to the information processing device 100, it is possible to use the prediction model that predicts the unit that appears immediately before or immediately after the input word. As a result, the information processing device 100 can accurately determine whether or not the estimated relationship is appropriate. Furthermore, the information processing device 100 can cope with a case where the unit appears immediately before the word.

According to the information processing device 100, it is possible to learn the prediction model on the basis of the learning data in which the word string is associated with the correct answer data indicating the word that appears immediately before or immediately after one word in the word string. As a result, the information processing device 100 can predict the word that appears immediately before or immediately after the input word.

According to the information processing device 100, the first sentence can be acquired. According to the information processing device 100, it is possible to determine whether or not any one of the words in the acquired first sentence is a unit on the basis of the rule. According to the information processing device 100, in a case of determining that the word is a unit, it is possible to generate the learning data in which the word string excluding one word in the acquired first sentence is associated with the correct answer data indicating the one word. According to the information processing device 100, it is possible to learn the prediction model on the basis of the generated learning data. As a result, the information processing device 100 can automatically generate the learning data and can reduce a workload of a user.

According to the information processing device 100, in a case of determining that the relationship is appropriate, it is possible to generate learning data in which the acquired sentence is associated with the correct answer data indicating the estimated relationship between the first word and the second word. According to the information processing device 100, it is possible to learn the discrimination model that discriminates the relationship between any words in the input sentence on the basis of the generated learning data. As a result, the information processing device 100 can generate a discrimination model with relatively high discrimination accuracy.

According to the information processing device 100, it is possible to estimate the relationship between the first word and the second word on the basis of the correspondence information in which the word pair is associated with the relationship of the word pair. As a result, the information processing device 100 can specify a target to be determined whether or not to be appropriate by the information processing device 100.

According to the information processing device 100, it is possible to use a numerical value for the first word and a name of a compound for the second word. As a result, the information processing device 100 can generate the discrimination model that discriminates the relationship between the name of the compound and the numerical value to be a physical property value in the chemistry field. Then, the information processing device 100 can easily provide services related to the chemistry field.

According to the information processing device 100, it is possible to use a numerical value for the first word and a name of a place for the second word. As a result, the information processing device 100 can generate the discrimination model that discriminates the relationship between the name of the place and the numerical value to be the attribute value of the place. Then, the information processing device 100 can easily provide the service related to the specific place.

According to the information processing device 100, it is possible to use a numerical value for the first word and a name of an organization for the second word. As a result, the information processing device 100 can generate the discrimination model that discriminates the relationship between the name of the organization and the numerical value to be the attribute value of the organization. Then, the information processing device 100 can easily provide the service related to the specific organization.

According to the information processing device 100, it is possible to use a numerical value for the first word and a name of a person for the second word. As a result, the information processing device 100 can generate the discrimination model that discriminates the relationship between the name of the person and the numerical value to be the attribute value of the person. Then, the information processing device 100 can easily provide the services related to the person.

According to the information processing device 100, it is possible to use a name of a place for the first word. As a result, the information processing device 100 can generate the discrimination model that discriminates the relationship between the name of the person or the organization and the name of the place. Furthermore, the information processing device 100 can generate the discrimination model that discriminates the relationship between the names of the two places. Then, the information processing device 100 can easily provide the service related to the specific person or organization.

According to the information processing device 100, it is possible to use the word that appears after the second word in the acquired sentence, as the first word. As a result, the information processing device 100 can generate the learning data in a case where the word related to the second word exists after the second word.

According to the information processing device 100, it is possible to refer to the storage unit that stores each relationship between the words in association with the rule regarding the unit corresponding to the corresponding relationship. As a result, the information processing device 100 can estimate the relationship of the word pair. Furthermore, the information processing device 100 can reduce a storage amount of the storage unit by summarizing rules regarding units related to different word pairs having the same relationship.

According to the information processing device 100, it is possible to refer to the storage unit that stores each word pair in association with the rule regarding the unit corresponding to the relationship of the corresponding word pair. As a result, the information processing device 100 can estimate the relationship of the word pair.

Note that the information processing method described in the present embodiment may be implemented by executing a prepared program on a computer such as a personal computer or a workstation. The information processing program described in the present embodiment is recorded in a computer-readable recording medium such as a hard disk, a flexible disk, a compact disc (CD)-ROM, an MO, or a digital versatile disk (DVD) and is read from the recording medium by a computer to be executed. Furthermore, the information processing program described in the present embodiment may also be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing method in which a computer executes processing comprising:
    acquiring an unprocessed sentence;
    assigning a relationship candidate to each pair of a name of a compound and a numerical value without a unit in the acquired sentence;
    acquiring the numerical value without the unit in the pair using an unlearned model;
    predicting the first unit for the numerical value by using a prediction model that predicts a word that appears immediately before or immediately after an input word, wherein to predict the unit for the numerical value the input is the numerical value;
    acquiring a second unit corresponding to the relationship candidate with reference to a storage;
    determining whether the relationship exists in the relationship database;
    determining whether the first unit matches the second unit if the relationship exists;
    generating learning data regarding the relationship candidate based on the acquired sentence when the first unit matches the second unit; and
    training a discrimination model that discriminates a relationship between words using the learning data.

2. The information processing method according to claim 1, wherein, in a case where the first unit matches the second unit, a relationship of the pair is appropriate, and in a case where the first unit does not match the second unit, the relationship of the pair is not appropriate.

3. The information processing method according to claim 1, wherein, in a case where the first unit for the numerical value is not predicted by using the prediction model, the relationship of the pair is not appropriate.

4. The information processing method according to claim 1, wherein the prediction model is learned based on learning data in which a word string is associated with correct answer data that indicates a word that appears immediately before or immediately after one word in the word string.

5. The information processing method according to claim 1, wherein the first unit for the numerical value is predicted based on correspondence information in which a word pair is associated with a relationship of the word pair.

6. The information processing method according to claim 1, wherein the storage stores each pair in association with a rule regarding a unit that corresponds to a relationship of the corresponding pair.

7. A non-transitory computer-readable recording medium storing an information processing program causing a computer to execute a processing, the processing comprising:
　acquiring an unprocessed sentence;
　　assigning a relationship candidate to each pair of a name of a compound and a numerical value without a unit in the acquired sentence;
　　acquiring the numerical value without the unit in the pair using an unlearned model;
　　predicting the first unit for the numerical value by using a prediction model that predicts a word that appears immediately before or immediately after an input word, wherein to predict the unit for the numerical value the input word is the numerical value;
　　acquiring a second unit corresponding to the relationship candidate with reference to a storage;
　　determining whether the relationship exists in the relationship database;
　　determining whether the first unit matches the second unit if the relationship exists;
　　generating learning data regarding the relationship candidate based on the acquired sentence when the first unit matches the second unit; and
　　training a discrimination model that discriminates a relationship between words using the learning data.

8. An information processing apparatus comprising:
a memory; and
a processor coupled to the memory and configured to:
acquire an unprocessed sentence;
assign a relationship candidate to each pair of a name of a compound and a numerical value without a unit in the acquired sentence;
acquire the numerical value without the unit in the pair using an unlearned model;
predict the first unit for the numerical value by using a prediction model that predicts a word that appears immediately before or immediately after an input word, wherein to predict the unit for the numerical value the input word is the numerical value;
acquire a second unit corresponding to the relationship candidate with reference to a storage;
determine whether the relationship exists in the relationship database;
determine whether the first unit matches the second unit if the relationship exists;
generate learning data regarding the relationship candidate based on the acquired sentence when the first unit matches the second unit; and
train a discrimination model that discriminates a relationship between words using the learning data.

\* \* \* \* \*